United States Patent
Kim et al.

(10) Patent No.: US 9,973,839 B2
(45) Date of Patent: May 15, 2018

(54) METHOD AND APPARATUS FOR COMMUNICATING AUDIO DATA

(71) Applicant: Samsung Electronics Co., Ltd., Gyeonggi-do (KR)

(72) Inventors: Su-Hwan Kim, Gyeonggi-do (KR); Soo-Yong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/616,593

(22) Filed: Jun. 7, 2017

(65) Prior Publication Data

US 2017/0272851 A1  Sep. 21, 2017

Related U.S. Application Data

(63) Continuation of application No. 14/712,469, filed on May 14, 2015, now Pat. No. 9,693,127.

(60) Provisional application No. 61/996,848, filed on May 14, 2014.

(30) Foreign Application Priority Data

Nov. 6, 2014  (KR) .......................... 10-2014-0153583

(51) Int. Cl.
| | |
|---|---|
| *H04R 3/00* | (2006.01) |
| *H04W 52/02* | (2009.01) |
| *H04W 4/00* | (2018.01) |
| *H04W 76/00* | (2018.01) |
| *H04W 4/06* | (2009.01) |
| *H04R 1/10* | (2006.01) |
| *H04L 29/06* | (2006.01) |

(52) U.S. Cl.
CPC ............. *H04R 1/1016* (2013.01); *H04R 3/00* (2013.01); *H04W 4/008* (2013.01); *H04W 4/06* (2013.01); *H04W 4/80* (2018.02); *H04W 52/02* (2013.01); *H04W 52/0216* (2013.01); *H04W 52/0219* (2013.01); *H04W 76/00* (2013.01); *H04W 76/002* (2013.01); *H04W 76/40* (2018.02); *H04L 69/22* (2013.01); *H04R 2420/07* (2013.01); *H04R 2460/03* (2013.01); *Y02B 60/50* (2013.01); *Y02D 70/00* (2018.01)

(58) Field of Classification Search
CPC . H04W 76/00; H04W 52/02; H04W 52/0219; H04W 52/0216; H04W 76/002; H04R 1/1016; H04R 3/00; H04R 2420/07
See application file for complete search history.

(56) References Cited

U.S. PATENT DOCUMENTS

| | | | | |
|---|---|---|---|---|
| 2006/0111044 | A1* | 5/2006 | Keller | ...................... H04M 1/05 455/41.2 |
| 2012/0196534 | A1* | 8/2012 | Kasslin | .................. H04W 76/40 455/41.2 |
| 2012/0257561 | A1* | 10/2012 | Redding | ............. H04L 12/1827 370/312 |

(Continued)

*Primary Examiner* — Brenda C Bernardi
(74) *Attorney, Agent, or Firm* — The Farrell Law Firm, P.C.

(57) ABSTRACT

A method and an apparatus are provided for transmitting audio data. The method includes setting a connection with a plurality of slave devices by using a short range wireless communication protocol, generating a data packet comprising the audio data, and repetitively transmitting the data packet to the plurality of slave devices through a multicast/broadcast channel a number of times.

20 Claims, 18 Drawing Sheets

(56) References Cited

U.S. PATENT DOCUMENTS

| | | | |
|---|---|---|---|
| 2013/0034005 A1* | 2/2013 | Xhafa | H04W 76/02 370/252 |
| 2013/0045684 A1 | 2/2013 | Linde et al. | |
| 2014/0348327 A1* | 11/2014 | Linde | H04H 20/88 381/2 |
| 2015/0010179 A1* | 1/2015 | Solum | H04R 25/558 381/315 |
| 2015/0195857 A1* | 7/2015 | Pan | H04W 76/10 455/41.3 |
| 2015/0312858 A1* | 10/2015 | Kerai | H04W 52/0212 370/311 |
| 2015/0319557 A1* | 11/2015 | El-Hoiydi | H04W 4/008 455/41.2 |

* cited by examiner

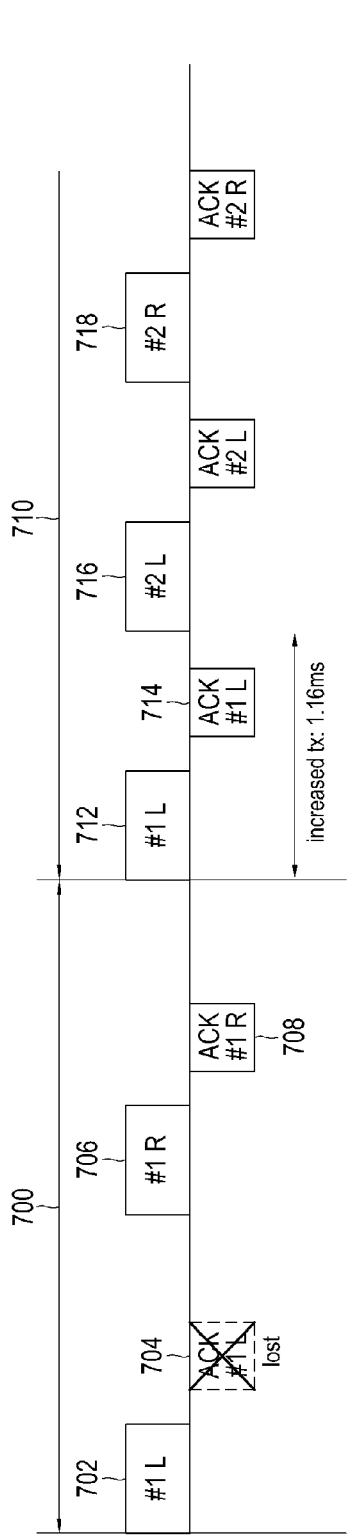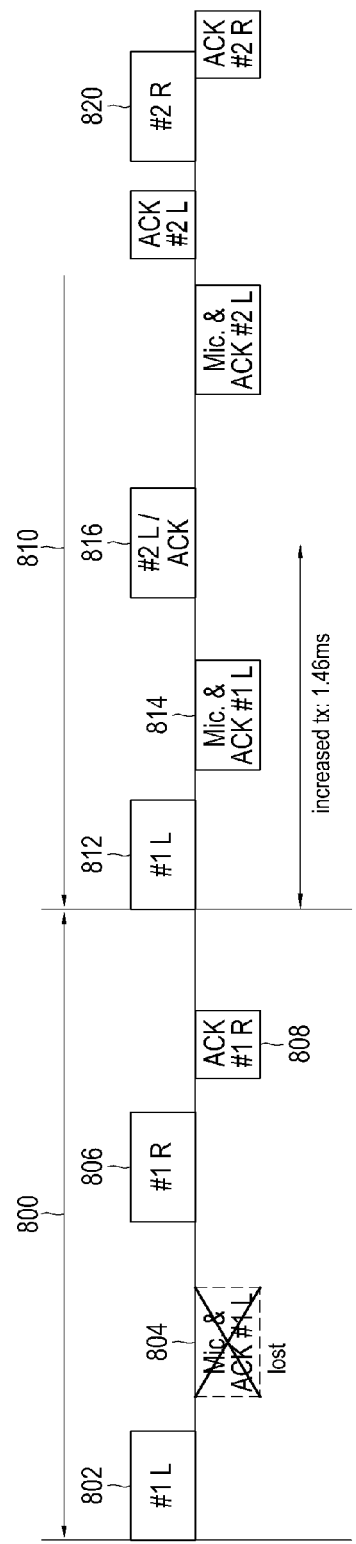
FIG.7
FIG.8

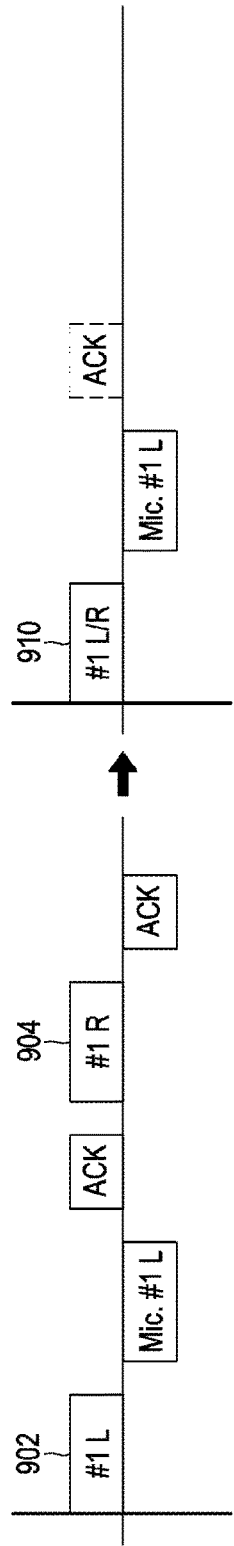
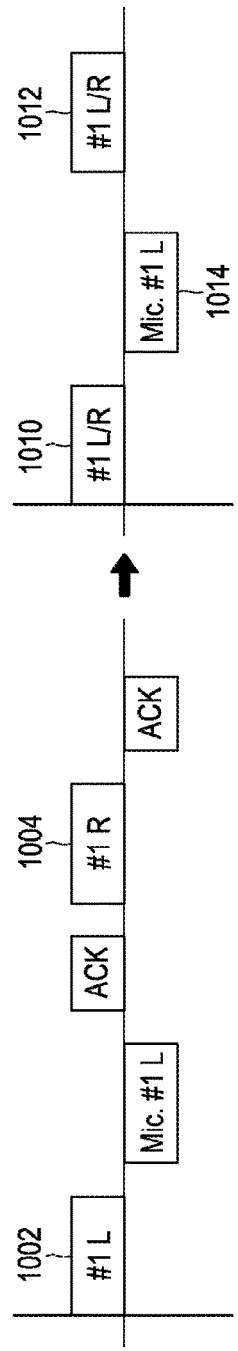
FIG.9
FIG.10

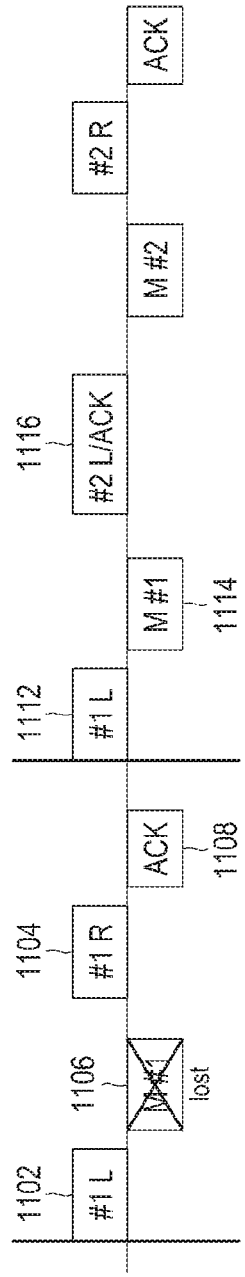
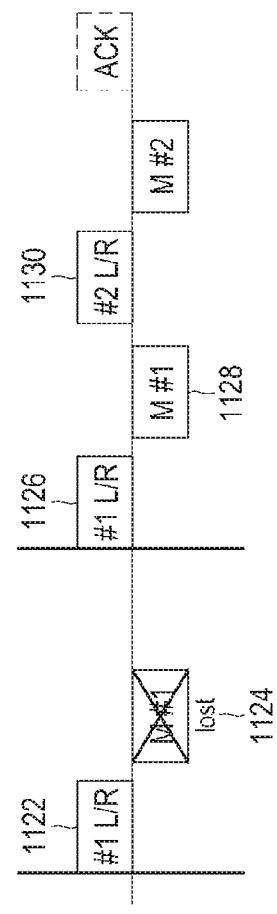
FIG. 11A
FIG. 11B

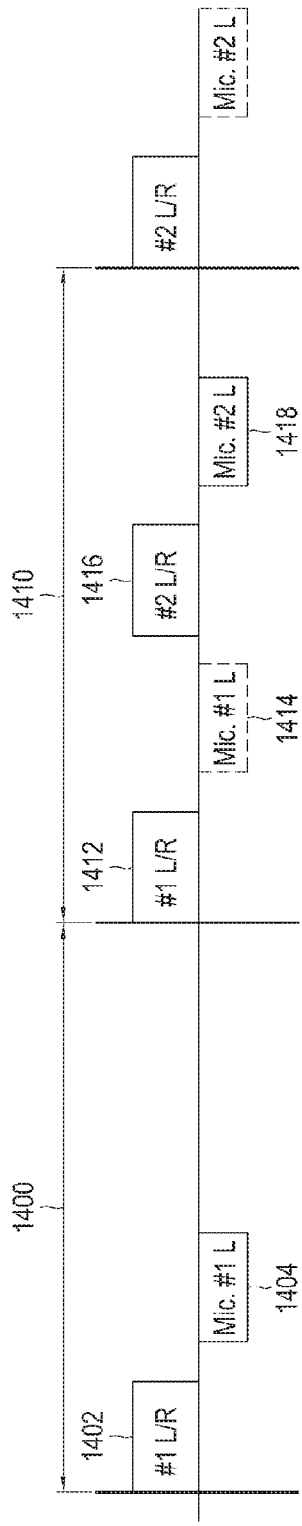
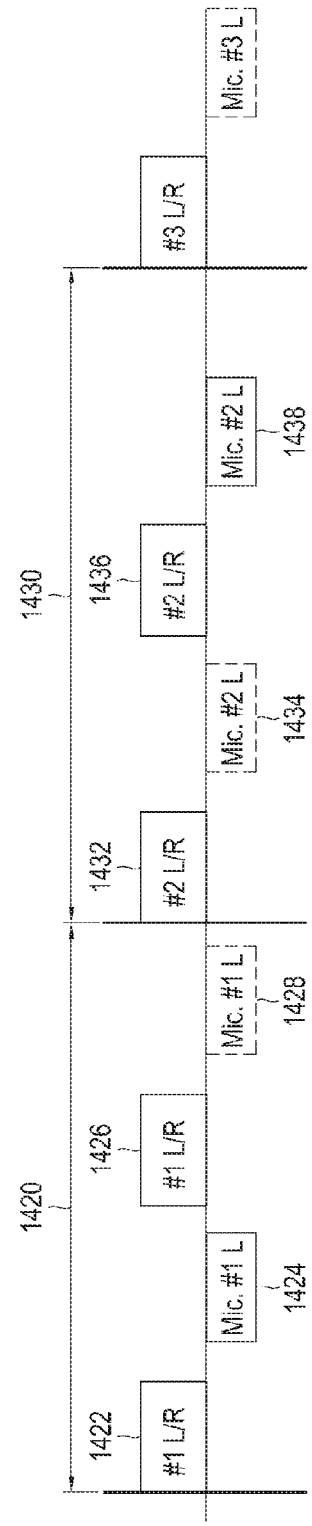
FIG. 14A
FIG. 14B

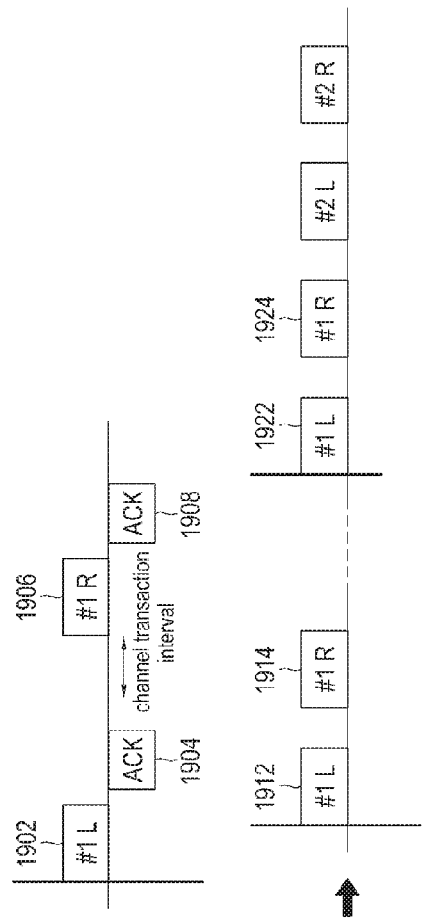
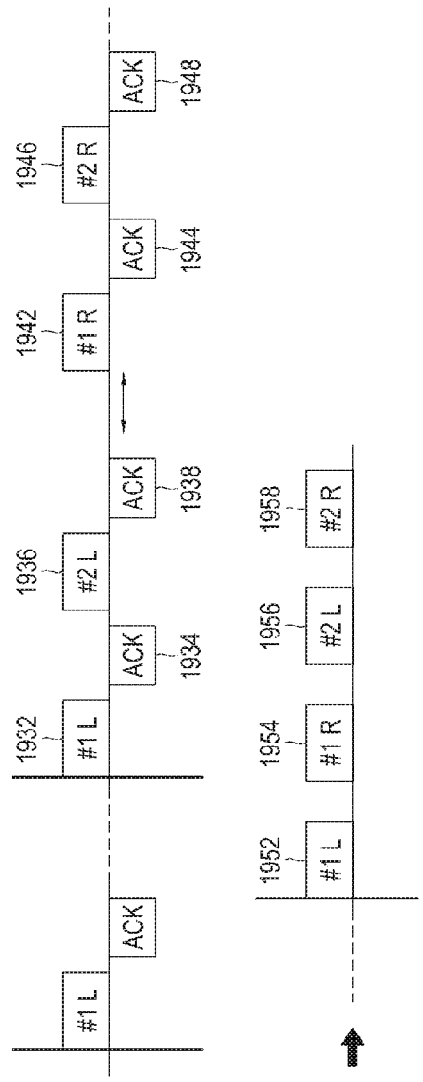
FIG.19A
FIG.19B

METHOD AND APPARATUS FOR COMMUNICATING AUDIO DATA

PRIORITY

This application is a Continuation Application of U.S. patent application Ser. No. 14/712,469, filed May 14, 2015, and claims priority under 35 U.S.C. § 119(e) to U.S. Provisional Application Ser. No. 61/996,848, which was filed in the U.S. Patent and Trademark Office on May 14, 2014, and under 35 U.S.C. § 119(a) to Korean Patent Application Serial number 10-2014-0153583, which was filed in the Korean Intellectual Property Office on Nov. 6, 2014, the entire disclosure of each of which are incorporated herein by reference.

BACKGROUND

1. Field of the Disclosure

Various embodiments of the present disclosure relate to a low-power audio data transmission method and apparatus using a multicast/broadcast channel.

2. Description of the Related Art

Bluetooth® Low Energy (BLE) or Bluetooth® LE, which is a wireless personal area network based on Bluetooth®, i.e., a short range wireless protocol, has been developed to reduce power consumption and cost in comparison to conventional Bluetooth®, while maintaining a communication range for health care, fitness, security, home entertainment, etc.

By the nature of a protocol designed to restrict a symbol rate and to minimize power consumption, BLE may not provide a sufficiently high data rate or may consume too much power due to retransmissions in noisy environments.

Accordingly, a need exists for a technique capable of achieving the same audio quality, but using less power in the same environment, by minimizing power consumption at a restricted data rate.

SUMMARY

The present disclosure has been made to at least partially solve, alleviate, or remove at least one of problems and/or disadvantages described above, and to provide at least the advantages described below.

Accordingly, various aspects of the present disclosure provide a method and apparatus for transmitting audio data in a communication system.

Various aspects of the present disclosure also provide an audio transmission method and apparatus using BLE.

Various aspects of the present disclosure also provide a method and an apparatus for transmitting audio data by using a multicast/broadcast channel.

Various aspects of the present disclosure also provide a method and an apparatus for transmitting audio data through a multicast/broadcast channel by using BLE.

According to an aspect of the present disclosure, a method is provided for transmitting audio data by a master device. The method includes setting a connection with a plurality of slave devices by using Bluetooth low energy, generating a data packet comprising the audio data, and repetitively transmitting the data packet to the plurality of slave devices through a multicast/broadcast channel a number of times, with a maximum number of times of the repetitively transmitting of the packet data to the plurality of slave devices being determined based on a maximum connection interval.

BRIEF DESCRIPTION OF THE DRAWINGS

The above and other aspects, features and advantages of embodiments of the present disclosure will be more apparent from the following description taken in conjunction with the accompanying drawings, in which:

FIG. 7 is a timing diagram illustrating a procedure for retransmitting audio data according to an embodiment of the present disclosure;

FIG. 8 is a timing diagram illustrating a procedure for retransmitting audio data according to another embodiment of the present disclosure;

FIG. 9 is a timing diagram illustrating mono audio transmission through a multicast/broadcast channel according to an embodiment of the present disclosure;

FIG. 10 is a timing diagram illustrating mono audio transmission through a multicast/broadcast channel according to another embodiment of the present disclosure;

FIGS. 11A and 11B are timing diagrams illustrating mono audio transmission through a multicast/broadcast channel according to another embodiment of the present disclosure;

FIGS. 14A and 14B are diagrams for describing management of a number of retransmissions according to an embodiment of the present disclosure;

FIGS. 19A and 19B illustrate a multicast/broadcast channel for stereo audio streaming according to an embodiment of the present disclosure;

Throughout the drawings, like reference numerals will be understood to refer to like elements, features, and structures.

DETAILED DESCRIPTION

Figure 1A:
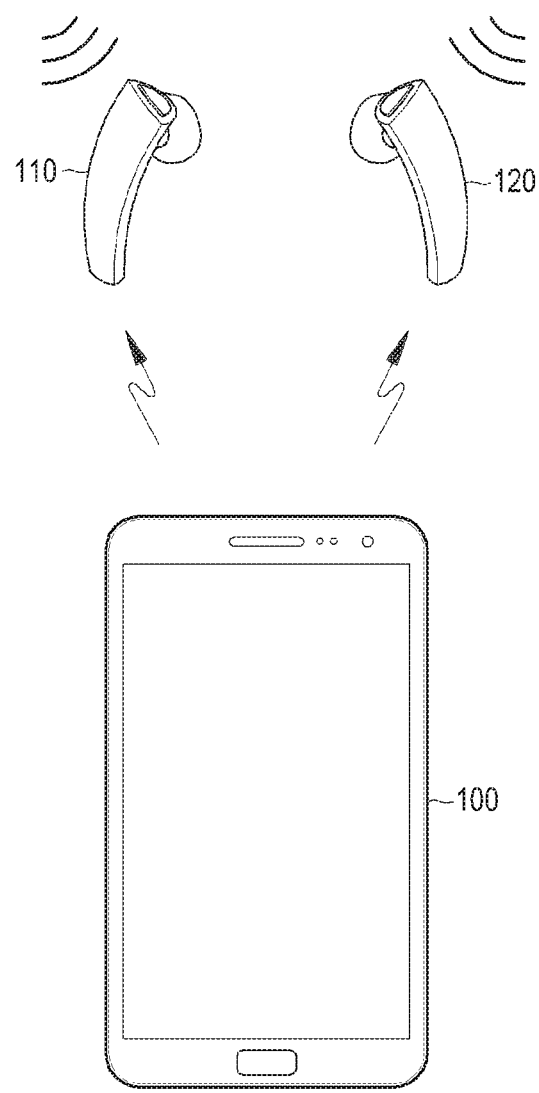
FIG. 1A illustrates a system for transmitting audio data according to an embodiment of the present disclosure.

Hereinafter, various embodiments of the present disclosure will be described in detail with reference to the accompanying drawings. In the description below, technical matters that are well known to a person having ordinary skill in the art and that are not directly related to the present disclosure will not be described in detail in order to avoid obscuring the present disclosure in unnecessary descriptions.

Likewise, some elements may have been exaggerated, omitted, or schematically illustrated in the attached drawings. In addition, a size of each element may not totally reflect a real size of the element. In each drawing, the same or corresponding element is referred to by the same reference numeral.

Herein, the term "unit" means a software or a hardware element like a Field-Programmable Gate Array (FPGA) or an Application Specific Integrated Circuit (ASIC), and the "unit" performs some roles. However, the "unit" is not limited to software or hardware. For example, the "unit" can be configured to exist in an addressable storage medium, and can be configured to operate at least one processor. Accordingly, as an example, the "unit" comprises elements selected from the group consisting of software element, object oriented software elements, class elements and task elements, and further comprises processes, functions, attributes, procedures, subroutines, segments of program code, drivers, firmware, microcode, circuits, data, databases, data constructions, tables, arrays, and variations thereof. The function provided in elements and "unit" can be any of coupled with more or less number of elements and the "units", and divided into additional elements and "units". In addition, elements and "unit" can be implemented to operate at least one Central Processing Unit (CPU) in a device and a security multimedia card.

Further, herein, the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this disclosure, those of ordinary skill in the art should understand that in many, if not most instances, such definitions apply to prior, as well as future uses of such defined words and phrases.

Although the present disclosure is related to a Bluetooth® or Gaussian Frequency Shift Keying (GFSK)-based wireless communication system, the subject matter of the present disclosure is applicable to other communication systems, protocols, and services having similar technical backgrounds and channel types in a range that does not depart from the scope of the present disclosure.

Embodiments of the present disclosure, as described below, provide efficient audio transmission protocols that may be used in subminiature devices such as hearing aids, headsets, etc., by transmitting audio data through a multicast/broadcast channel in a BLE or Bluetooth® LE.

FIG. 1A illustrates a system for transmitting audio data according to an embodiment of the present disclosure.

Referring to FIG. 1A, the system for transmitting audio data includes a master device 100 and slave devices 110 and 120.

The master device 100 is a digital device that may include several audio sources, such as a phone conversation, radio, a music player, etc., and may be a smart phone, a digital music player, a car stereo system, etc. The master device 100 transmits an output processed/mixed by an internal audio processor to the slave devices 110 and 120 by using a wireless communication device, such as a transceiver. The wireless communication device may operate using Bluetooth or BLE.

The slave devices 110 and 120 are audio devices configured to support BLE-based communication, such as a hearing aid, a headset, etc. The slave devices 110 and 120 are in charge of left and right sound, respectively.

Figure 1B:
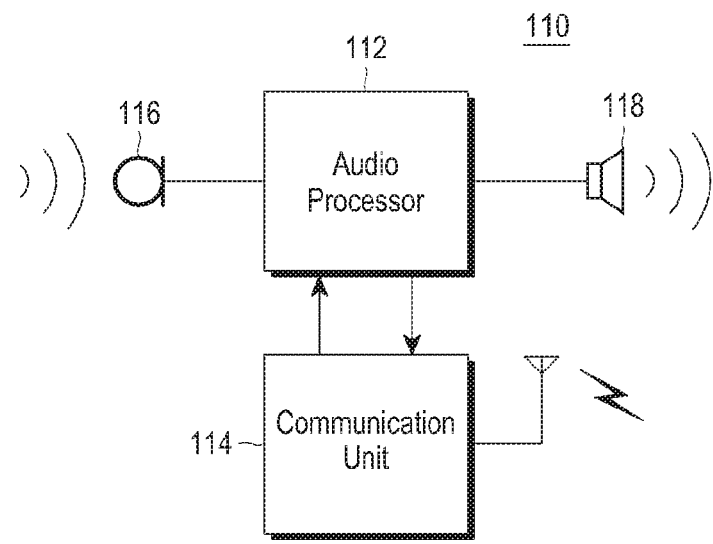
FIG. 1B illustrates an audio device according to an embodiment of the present disclosure.

FIG. 1B illustrates an audio device according to an embodiment of the present disclosure.

Referring to FIG. 1B, although the audio device is illustrated as the slave device 110, as illustrated in FIG. 1A, the illustrated audio device may also represent the master device 100 or the slave device 120, as illustrated in FIG. 1A.

Referring to FIG. 1B, the slave device 110 includes an input unit 116, an audio processor 112, an output unit 118, and a communication unit 114. The input unit 116, e.g., a microphone, converts received sound into an audio signal and forwards the audio signal to the audio processor 112. The output unit 118, e.g., a speaker, receives the audio signal from the audio processor 112, converts the received audio signal into sound that is audible to a user, and outputs the audible sound. The audio processor 112 interconnects the input unit 116 with the communication unit 114 or the output unit 118 with the communication unit 114, and processes the audio signal. The communication unit 114 receives a control and/or audio signal from the master device 100 and forwards the control and/or audio signal to the audio processor 112 for output to the output unit 118, or transmits data such as the audio signal to the master device 100. The communication unit 114 is configured to support a short range wireless communication protocol, such as Bluetooth® or BLE.

Figure 2:
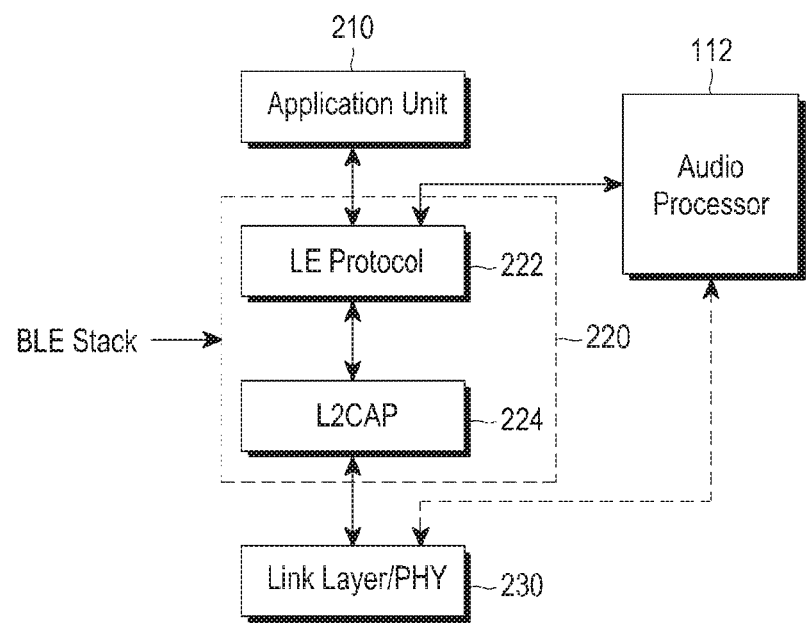
FIG. 2 is a block diagram illustrating a communication unit supporting BLE according to an embodiment of the present disclosure.

FIG. 2 is a block diagram illustrating a communication unit supporting BLE according to an embodiment of the present disclosure.

Referring to FIG. 2, the communication unit includes an application unit 210, a BLE stack 220, and a link/physical layer unit 230. The application unit 210 may be omitted depending on a configuration of the audio device, and may control the processing or synthesizing the audio signal.

The BLE stack 220 includes a LE protocol unit 222 and a Logical Link Control and Adaptation (L2CAP) unit 224. The LE protocol unit 222 manages a generic access profile and a generic attribute profile, and controls an attribute protocol and security management. The L2CAP unit 224 supports higher-level protocol multiplexing, packet segmentation and reassembly, and conveying of Quality of Service (QoS) information. The L2CAP unit 224 controls a higher-level protocol and an application to transmit a higher-level data packet, i.e., an L2CAP Service Data Unit (SDU), and performs channel-flow-specific control through control of a flow and a retransmission mode. The L2CAP unit 224 provides logical channels, which are commonly referred to as L2CAP channels, each of which may operate in a basic L2CAP mode, a flow control mode, and the retransmission mode.

The audio processor 112 transmits the audio signal to the BLE stack 220 or receives the audio signal through the BLE stack 220. The audio processor 112 may directly transmit the audio signal to the link/physical layer unit 230 or receive the audio signal, without passing through the BLE stack 220.

The link/physical layer unit 230 performs retransmission of audio data based on BLE. The link/physical layer unit 230 may include a communication circuit for converting an input audio signal into a Bluetooth®-based data packet for wireless transmission and extracting the data packet from the wirelessly received signal, and a processor for controlling transmission and reception performed by the communication circuit.

Figure 3A:
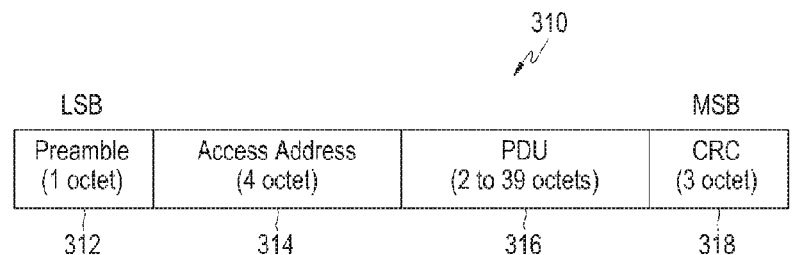
FIGS. 3A to 3C illustrate packet formats of a Bluetooth link layer according to an embodiment of the present disclosure.
Figure 3B:
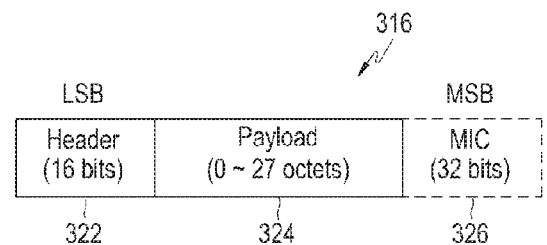
Figure 3C:
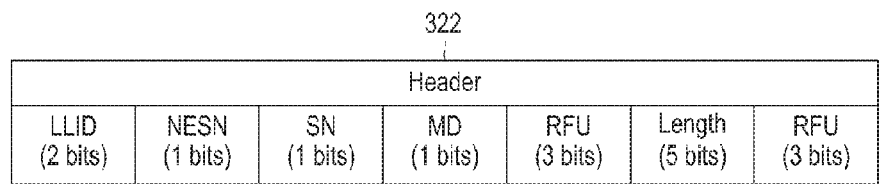

FIGS. 3A through 3C illustrate a packet format of a Bluetooth link layer according to an embodiment of the present disclosure.

Referring to FIG. 3A, a data packet 310 includes a preamble 312 of 1 octet, an access address 314 of 4 octets, a Protocol Data Unit (PDU) 316 of 2 to 39 octets, and a Cyclic Redundancy Check (CRC) code 318 of 3 octets. The preamble 312 contains a code for synchronization, and the access address 314 includes an access code corresponding to a type of the data packet 310. The PDU 316 carries a payload of data to be transmitted, and the CRC 318 supports integrity of the data packet 310.

Referring to FIG. 3B, the PDU 316 includes a header 322 of 16 bits, a payload field 324 of 0 to 27 octets, and an optional Message Integrity Check (MIC) code 326 of 32 bits.

Referring to FIG. 3C, the header 322 includes a 2-bit Link Layer ID (LLID), a 1-bit Next Expected Sequence Number (NESN) field, a 1-bit Sequence Number (SN) field, a 1-bit More Data (MD) field, a 3-bit Reserved for Future Use (RFU), a 5-bit length field, and a 3-bit RFU. The LLID indicates a type (data or control) on a link layer of the PDU 316. The NESN field indicates a Serial Number (SN) of the next packet desired for reception. The SN field indicates an SN of the current packet 310. The SN field and the NESN field support acknowledgement and flow control of packets. The MD field indicates whether a transmission-side device has data to be transmitted. The length field indicates a length of the payload field 324 and the MIC code 326.

Figure 4:
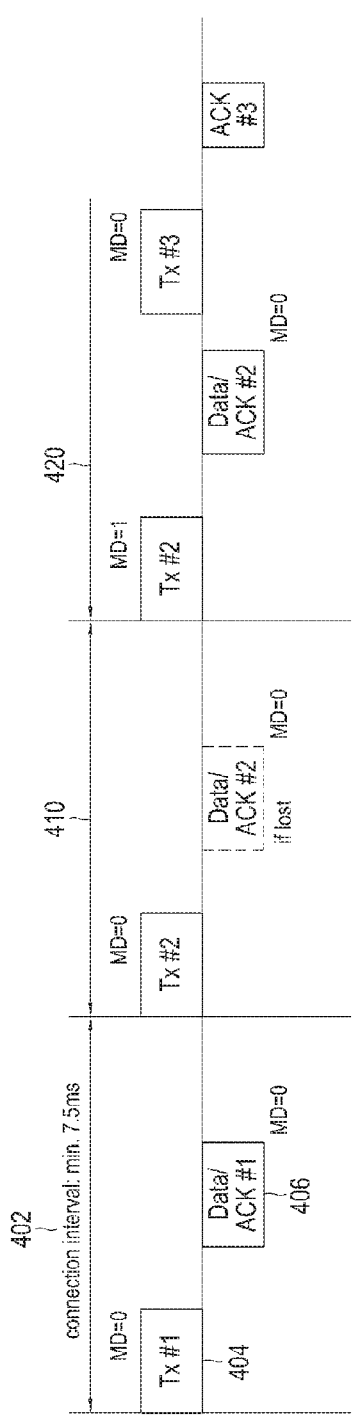
FIG. 4 is a timing diagram illustrating a data transmission and acknowledgement procedure according to an embodiment of the present disclosure.

FIG. 4 is a timing diagram illustrating a data transmission and acknowledgement procedure according to an embodiment of the present disclosure.

Referring to FIG. 4, data transmission and acknowledgement are performed based on a given Connection Interval (CI) 402. The CI 402 has a length of a minimum of 7.5 ms. At the start of CI 402, a transmission side transmits transmission data Tx #1 404 that is set for MD=0. A reception side transmits data (Data) that is set for MD=0 and an acknowledgement ACK #1 406 in the same CI 402 to notify that the transmission data Tx #1 404 has been successfully received. Since MD=0 for both the transmission side and the reception side, data transmission is not performed any longer in the current CI 402.

At the start of a next CI 410, the transmission side transmits transmission data Tx #2, and data (Data) and an acknowledgement ACK #2 transmitted by the reception side are lost, failing to arrive in the transmission side in the CI 410. Then, the transmission side retransmits the transmission data Tx #2 at the start of a next CI 420. In the same CI 420, the reception side transmits the data (Data) and the acknowledgement ACK #2 to notify that the transmission data Tx #2 has been successfully received. The transmission data Tx #2 includes MD=1, such that the transmission side transmits transmission data Tx #3 in the CI 420. An acknowledgement ACK #3 for transmission data Tx #3 is also transmitted in the same CI 420.

Restrictions on implementation of audio streaming using BLE may include a low transmission speed due to the restrictions of a low symbol rate of 1 Mbps, a maximum packet length of 184 bits, and a CI of a minimum of 7.5 ms, and a restriction on the number of retransmissions due to non-guaranteed continuous data delivery caused by a process latency problem. To obtain 32 kbps in the CI of 7.5 ms, a packet length of 240 bits is used. In this case, additional transmission may be used in a CI, or length extension may be used. General requirements for audio streaming (mono for voice) include:

low power consumption of 2-3 mA;
a sample rate of 32 kbps for mono and 64 kbps for stereo; and
a latency of less than 20 ms.

The maximum length of a CI is defined as shown in Equation (1).

$$\text{Max CI} = 20 \text{ ms} - \text{audio encode/decode time} - 1 \text{ max packet length} - 1 \text{ packet process delay} - \text{jitter margin} \quad (1)$$

Figure 5:
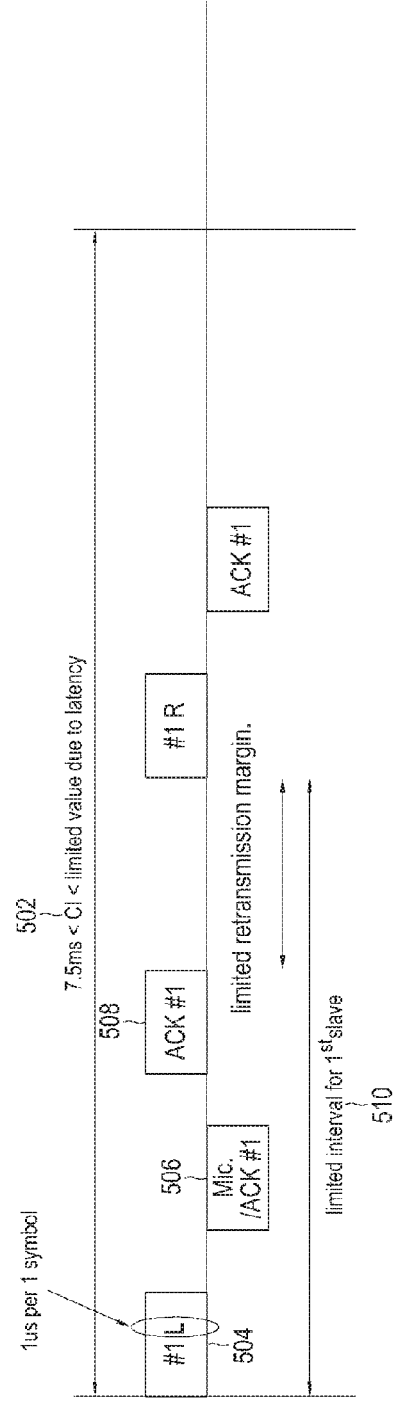
FIG. 5 illustrates a transmission procedure for voice audio transmission and reception according to an embodiment of the present disclosure.

FIG. 5 illustrates a transmission procedure for voice audio transmission and reception according to an embodiment of the present disclosure. In an illustrated example, communication between a left slave device having a microphone and a speaker, a right slave device having a speaker, and a master device is illustrated.

Referring to FIG. 5, a CI 502 has a value that is greater than 7.5 ms and less than a limited value due to latency, and includes a first limited interval 510 for the left slave device and a second limited interval for the right slave device. At the start of CI 502, i.e., the start of the first limited interval 510, left audio data #1 L 504 is transmitted to the slave device, after which microphone data (Mic.) and an acknowledgement ACK #1 506 corresponding to the left audio data are transmitted to the master device. Thereafter, an acknowledgement ACK #1 508 corresponding to the microphone data (Mic.) is transmitted to the slave device. If the first limited interval 510 has expired, a second limited interval starts for right audio data #1 R.

For use in stereo music playback, an audio path between the master device and each slave device carries different audio data for left and right sounds. For use in mono audio/voice, such as a mono record file, a voice mail, a phone call, etc., the transmission side copies the same voice data and transmits the copied voice data to each slave device.

A quality factor for an audio device considers audio quality and power consumption. The audio quality is determined by robustness, a packet transfer rate, a retransmission rate, etc. Power consumption is determined by a packet length and overhead, a lower packet transmission speed, less retransmission attempts, etc. BLE supports lower power consumption and faster connection time than conventional Bluetooth®, and needs to support transmission of audio data and control data (audio control data and link control data) to implement an audio device using BLE.

Figures 6A, 6B:
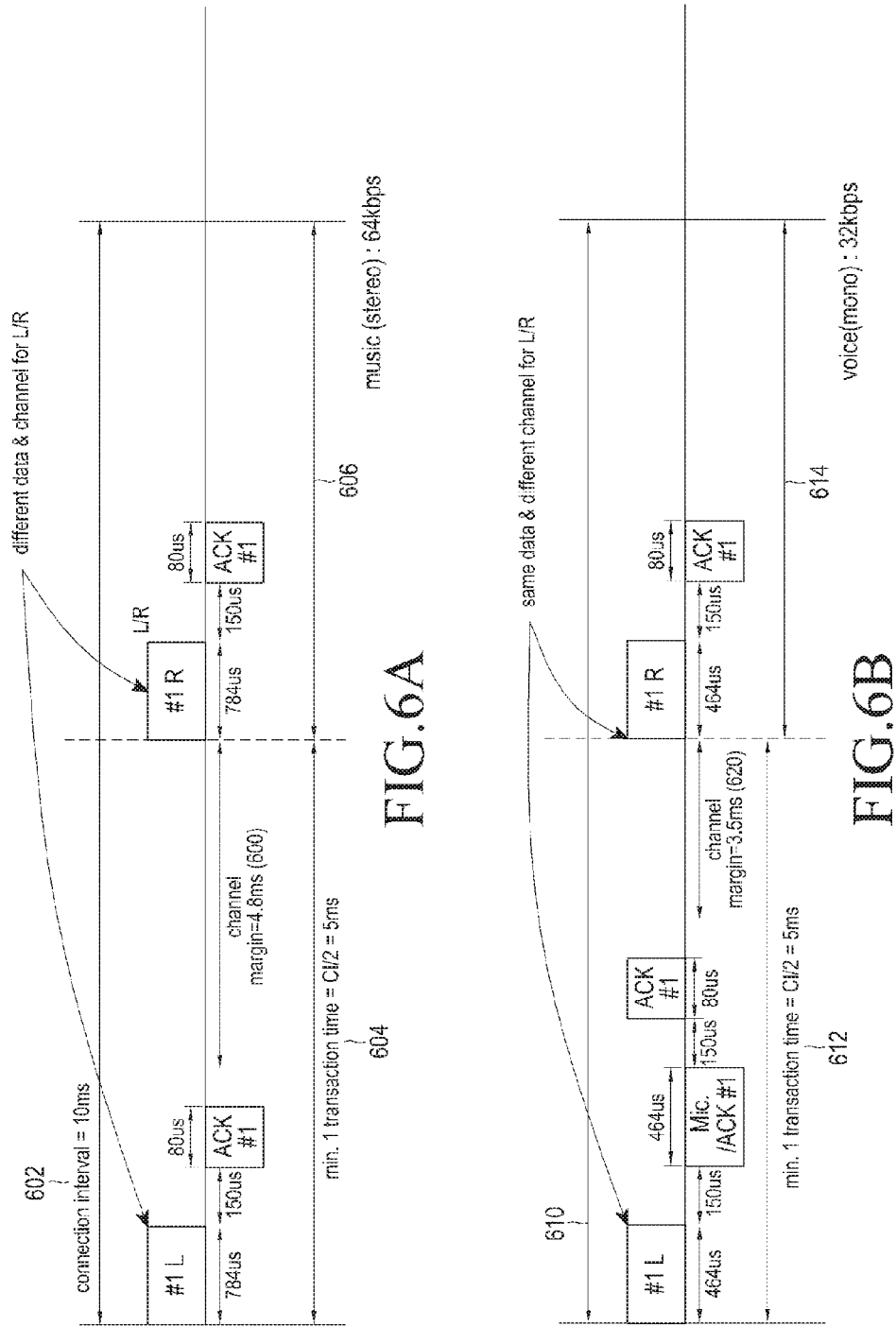
FIGS. 6A and 6B are timing diagrams illustrating an example of audio data transmission according to an embodiment of the present disclosure.

FIGS. 6A and 6B are timing diagrams illustrating an example of audio data transmission according to an embodiment of the present disclosure, in which a single packet including stereo music data (in FIG. 6A) or mono voice data (in FIG. 6B) is transmitted in one CI.

Referring to FIG. 6A, a CI 602 has a length of 10 ms and includes at least one transaction times 604 and 606 for each slave device. For two slave devices, each of the transaction times 604 and 606 has a length of CI/2=5 ms.

Left audio data #1 L is transmitted at the start of the first transaction time 604 in the CI 602. After an Inter Frame Spacing (IFS) being set to 150 µs (micro seconds), an acknowledgement ACK #1 is transmitted.

At the start of the second transaction time 606, right audio data #1 R including different data of a different channel is transmitted. After the IFS, the acknowledgement ACK #1 is transmitted. An empty packet for acknowledgement has a length of 10 octets and occupies a transmission interval of 80 µs. To support retransmission, in the transaction times 604 and 606, each transmission should be performed prior to a given channel margin 602 (for example, 4.8 ms). The channel margin 602 refers to a limited margin in which further data transmission to the same slave device is possible.

Referring to FIG. 6B, a CI 610 has a length of 10 ms and includes at least one transaction times 612 and 614 for each slave device. For two slave devices, each of the transaction times 612 and 614 has a length of CI/2=5 ms.

Left audio data #1 L is transmitted at the start of the first transaction time 612 in the CI 610. After a given IFS, microphone data (Mic.) and an acknowledgement ACK #1 are transmitted. At the start of the second transaction time 614, right audio data #1 R including the same data of a different channel is transmitted. After the IFS, the acknowledgement ACK #1 is transmitted. An empty packet for acknowledgement occupies a transmission interval of 80 µs. A channel margin 620 refers to a limited margin in which further data transmission to the same slave device is possible.

FIG. 7 is a timing diagram illustrating a procedure for retransmitting audio data according to an embodiment of the present disclosure, in which a first left acknowledgement packet is lost in a 64 kbps audio transmission.

Referring to FIG. 7, in a CI 700, left audio data #1 L 702 is transmitted and a corresponding acknowledgement ACK #1 L 704 is not received. In the same CI 700, the master device transmits right audio data #1 R 706 and normally receives a corresponding acknowledgement ACK #1 R 708. The master device retransmits left audio data #1 L 712 at the start of a next CI 710, and receives a corresponding acknowledgement ACK #1 L 714 from the slave device. The master device transmits the next left audio data #2 L 716, after a given time (for example, 1.16 ms) from the transmission of the previous left audio data #1 L 712, and transmits the next right audio data #2 R 718 according to a given timing.

FIG. 8 is a timing diagram illustrating a procedure for retransmitting audio data according to another embodiment of the present disclosure, in which a first data from a first slave device is lost in a 32 kbps voice transmission.

Referring to FIG. 8, in a CI 800, left audio data #1 L 802 is transmitted to the first slave device and corresponding microphone data (Mic.) and a corresponding acknowledgement ACK #1 L 804 are not normally received by the master device. In the same CI 800, the master device transmits right audio data #1 R 806 and normally receives a corresponding acknowledgement ACK #1 R 808. The master device retransmits left audio data #1 L 812 at the start of the next CI 810, receives microphone data (Mic.) and an acknowledgement ACK #1 L 814 from the left slave device, transmits the next left audio data #2L/ACK 816 including an acknowledgement regarding the microphone data (Mic.) received from the left slave device, and then transmits the next right audio data #2 R 820.

For BLE, the number of possible retransmissions is limited by a symbol rate and a CI restricted by standards, and a required audio data latency. As a result, the same audio quality may be obtained with less power consumption by retransmitting data simultaneously to connected slave devices a predetermined number of times, without reception of an acknowledgement from each slave device. When mono audio data, such as a voice signal, is transmitted to a plurality of devices, transmission of left data and transmission of right data for left and right headsets are repetitive transmissions of the same data, which is wasteful. In particular, for BLE, since a maximum of two or three retransmissions are possible, due to the aforementioned restrictions of the standard, an efficient technique for mono audio streaming, such as increasing the number of possible retransmissions, is needed.

FIG. 9 is a timing diagram illustrating a mono audio transmission through a multicast/broadcast channel according to an embodiment of the present disclosure, in which a number of retransmissions is 0 in an environment having no packet loss. By using the multicast/broadcast channel, a process of copying the same data and a process of repetitively transmitting the same data for multiple slave devices may be reduced.

Referring to FIG. 9, in one CI, instead of transmitting left audio data #1 L 902 to a left slave device and transmitting right audio data #1 R 904 containing the same data to a right slave device, the master device transmits single audio data #1 L/R 910 containing the same data to the slave devices at the same time. Transmission of an acknowledgement regarding microphone data (Mic. #1 L) from a particular slave device may be omitted.

FIG. 10 is a timing diagram illustrating a mono audio transmission using a multicast/broadcast channel according to another embodiment of the present disclosure.

Referring to FIG. 10, in one CI, instead of transmitting left audio data #1 L 1002 to the left slave device and transmitting right audio data #1 R 1004 containing the same data to the right slave device, the master device transmits single audio data #1 L/R 1010 containing the same data to the slave devices at the same time. To cover an error that may occur in the slave devices, the master device may use a fixed retransmission number (i.e., a fixed number of retransmissions), regardless of acknowledgements from the slave devices. In the example illustrated in FIG. 10, the master device retransmits audio data #1 L/R 1012 containing the same data once more to allow each slave device to stably receive the audio data. Each slave device or a particular slave device may or may not transmit an acknowledgement regarding the audio data #1 L/R 1010 and #1 L/R 1012, and the master device may or may not transmit an acknowledgement regarding microphone data (Mic. #1 L 1014) from the particular slave device.

FIGS. 11A and 11B are timing diagrams illustrating a mono audio transmission using a multicast/broadcast channel according to another embodiment of the present disclosure, in which time and power consumption are compared for scenarios when a multicast/broadcast channel is not used (as illustrated in FIG. 11A) and when a multicast/broadcast channel is used (as illustrated in FIG. 11B), for the same error.

Referring to FIG. 11A, in one CI, the master device transmits left audio data #1 L 1102 to the left slave device and transmits right audio data #1 R 1104 containing the same data to the right slave device. After the transmission of the left audio data #1 L 1102, microphone data M #1 1106 containing an acknowledgement regarding the left audio data #1 L 1102 is lost, and the master device normally receives an acknowledgement ACK 1108 regarding the right audio data #1 R 1104 from the right slave device. In the next CI, the master device retransmits left audio data #1 L 1112 that is the same as the left audio data #1 L 1102 that has not been acknowledged, and upon receiving microphone data M #1 1114 including an acknowledgement regarding the left audio data #1 L 1112, the master device transmits the next left audio data #2 L/ACK 1116 including an acknowledgement regarding the microphone data M #1 1114. The left slave device having normally received the acknowledgement ACK then transmits the next microphone data M #2.

Referring to FIG. 11B, in one CI, the master device transmits left/right audio data #1 L/R 1122 to multiple slave devices through a multicast/broadcast channel, and a particular slave device transmits microphone data M #1 1124. In the next CI, the master device retransmits left/right audio data #1 L/R 1126 that is the same as the left/right audio data #1 L/R 1122, and then receives microphone data M #1 1128. In the same CI, the master device transmits the next left/right audio data #2 L/R 1130. Even when the microphone data M #1 1124 transmitted first is lost, the master device may successfully receive microphone data M #1 1128 in the next CI.

Limitations on the number of retransmissions for supporting audio data transmission using a multicast/broadcast channel may be indicated or negotiated by the master device during an establishment of the multicast/broadcast channel.

Alternatively, the master device may determine the number of retransmissions based on channel quality obtained through channel scanning, before establishing the multicast/broadcast channel.

As another alternative, the number of retransmissions may be updated through a channel update procedure in a connection state.

In an embodiment of an audio data transmission method using the multicast/broadcast channel, to transmit microphone data or control data using the same channel, to the master device, from one of multiple slave devices, one of the multiple slave devices may serve as a main slave device and the microphone data or control data may be forwarded to the master device from the main slave device. One of the multiple slave devices, which is equipped with a microphone and transmits microphone data to the master device, is the main slave device, and any other slave devices are sub slave devices.

The main-sub roles are fixed during connection establishment, and in the connection state, the roles may be changed by a predetermined role change procedure. For example, a headset having a microphone or a hearing aid that connects first may be a main slave device and the other audio devices may be sub slave devices.

In accordance with an embodiment of the present disclosure, only the main slave device may be configured to transmit an acknowledgement regarding audio data received from the master device. If the headset equipped with the microphone is the main slave device, the headset may incorporate an acknowledgement into microphone data to be transmitted to the master device.

The main slave device, like the master device, may repetitively transmit microphone data a fixed number of retransmissions, and the microphone data, like the audio data from the master device, may be repetitively transmitted in the same CI or in different CIs.

Alternatively, retransmission of the microphone data by the main slave device may be controlled according to an acknowledgement of the master device.

The number of retransmissions should be smaller than a maximum number of retransmissions. The maximum number of retransmissions may be determined based on a maximum CI, the number of slave devices, and a packet transfer time. For example, the maximum CI may be defined as shown in Equation (2).

$$\text{Max CI} = \text{max latency} - \text{audio encode/decode time} - 1 \text{ max packet length} - 1 \text{ packet process delay} - \text{jitter margin} \quad (2)$$

The main slave device may retransmit the microphone data according to a predetermined retransmission number.

In accordance with an embodiment of the present disclosure, each time an acknowledgement regarding data received from the master device is transmitted, the slave device may transmit the microphone data together with the acknowledgement. If there is no sensed voice, the microphone data may include null data.

The data and/or the acknowledgement from the main slave device may be transmitted during a slave transmission interval in a CI. Each slave device does not receive data in a retransmission interval if a previous packet is correctly received, depending on a previously-known retransmission number, thereby reducing power consumption. That is, each slave device listens to a retransmission from the master device during a retransmission interval, if the previous packet has not been correctly received.

The master device may separately set a unicast or multicast/broadcast channel for control data associated with audio data, when establishing a multicast/broadcast channel for the audio data. In this case, the audio data and the control data are distinguished from each other by a separate unicast channel for each slave device or by a channel ID of a header of L2CAP included in a header or payload of a PDU.

Alternatively, the audio data and the control data may be distinguished from each other by a PDU header or a channel ID of a header of L2CAP included in payload of a PDU, while sharing one multicast/broadcast channel. For example, one bit of an RFU may be set to '0' indicating audio data or '1' indicating control data. The bit of the RFU is referred to as a channel type indicator.

In accordance with another embodiment of the present disclosure, the channel type indicator includes a plurality of bits and is set to '0' indicating multicast/broadcast, '1' indicating the first slave, '2' indicating the second slave, etc.

Figure 12:
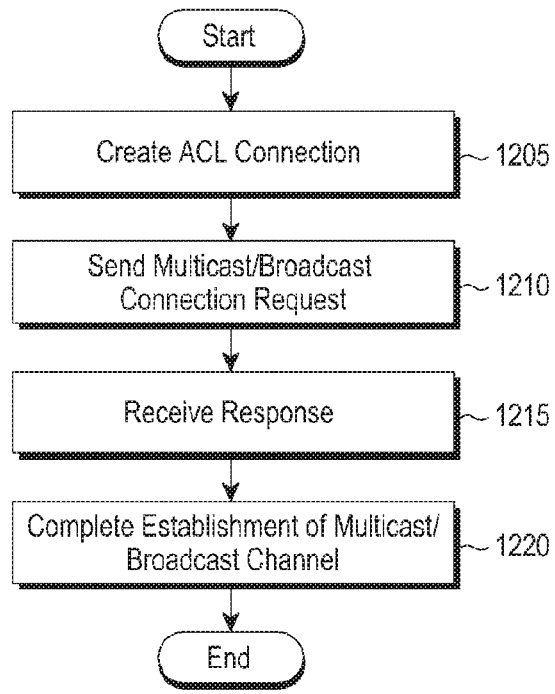
FIG. 12 is a flowchart illustrating a procedure for establishing a multicast/broadcast channel according to an embodiment of the present disclosure.

FIG. 12 is a flowchart illustrating a procedure for establishing a multicast/broadcast channel according to an embodiment of the present disclosure.

Referring to FIG. 12, in step 1205, the master device creates an Asynchronous Connection-Less (ACL) connection for data communication with multiple slave devices. The ACL connection is a transmission link used for high-speed data communication that is less-sensitive to a delay time in Bluetooth®.

In step 1210, the master device sends a multicast/broadcast connection request through the ACL connection. For example, the multicast/broadcast connection request includes at least one of an access address for the multicast/broadcast channel, time information, and a CI. A control PDU for creating the multicast/broadcast channel may be set to one of reserved values of the Bluetooth® standard. For example, the control PDU for the multicast/broadcast channel may be set to one of 0x14-0xFF.

In step 1215, the master device receives a response to the request and identifies each slave device having transmitted the response.

In step 1220, the master device completes establishment of the multicast/broadcast channel with each slave device having transmitted the response.

Thereafter, the access address determined by the establishment of the multicast/broadcast channel is used as an access code for every slave device that connects the multicast/broadcast channel.

Figure 13:
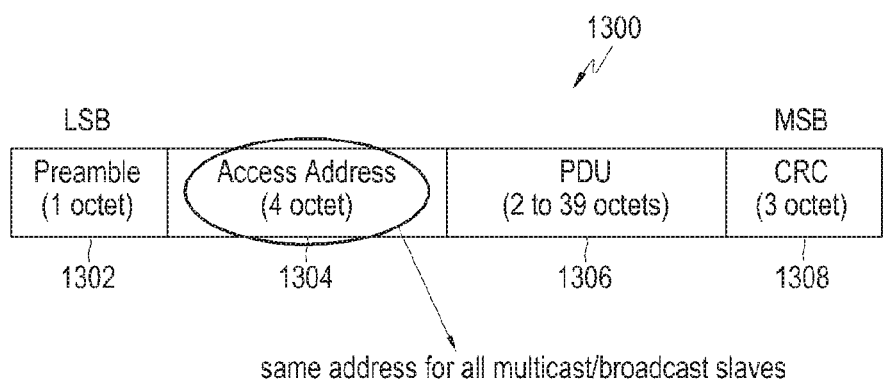
FIG. 13 illustrates an access address of a multicast/broadcast channel according to an embodiment of the present disclosure.

FIG. 13 illustrates an access address of a multicast/broadcast channel according to an embodiment of the present disclosure.

Referring to FIG. 13, a data packet 1300 includes a preamble 1302, an access address 1304, a PDU 1306, and a CRC 1308. The access address 1304 includes the same access code for every slave device that connects the multicast/broadcast channel Thus, the master device and each slave device may distinguish data of the multicast/broadcast channel from data of a different unicast channel, by using the access code.

For identification of an audio channel type prior to establishment of the multicast/broadcast channel, control data including an audio data type (mono, interactive (call), etc.) and a codec configuration may be used.

FIGS. 14A and 14B are diagrams for describing management of a number of retransmissions according to an embodiment of the present disclosure. In the illustrated example, a main slave device is a left slave device having a microphone and a sub slave device is a right slave device having no microphone, and retransmission for the multicast/broadcast channel may be performed in a different CI (as illustrated in FIG. 14A) or in the same CI (as illustrated in FIG. 14B).

Referring to FIG. 14A, the master device transmits left/right audio data #1 L/R 1402 to multiple slave devices through the multicast/broadcast channel at the start of CI 1400, and the left slave device transmits microphone data #1 L 1404 to the master device in the same CI 1400. If the number of retransmissions for the multicast/broadcast channel is 2, the master device retransmits left/right audio data #1 L/R 1412 at the start of the next CI 1410. If retransmission by a slave device is defined, the left slave device may retransmit microphone data Mic. #1 L 1414 in the CI 1410. The next left/right audio data #2 L/R 1416 and microphone data Mic. #2 L 1418 for the CI 1410 are transmitted after transmission of the left/right audio data #1 L/R 1412 (or the microphone data Mic. #1 L 1414). Likewise, second transmission of the left/right audio data #2 L/R 1416 may be performed in the next CI. If the number of retransmissions for the multicast/broadcast channel is greater than 2, retransmissions for single audio data may be performed across two or more CIs.

Referring to FIG. 14B, the master device transmits left/right audio data #1 L/R 1422 to multiple slave devices through the multicast/broadcast channel at the start of CI 1420, and the left slave device transmits microphone data Mic. #1 L 1424 to the master device in the same CI 1420. If the number of retransmissions for the multicast/broadcast channel is 2, the master device retransmits left/right audio data #1 L/R 1426 in the same CI 1420. If retransmission by a slave device is defined, the left slave device may also retransmit microphone data #1 L 1428 in the same CI 1420.

Likewise, in the next CI 1430, repetitive transmissions of left/right audio data #2 L/R 1432 and 1436 and repetitive transmissions of microphone data Mic. #2 L 1434 and 1438 may be performed. The number of retransmissions for the multicast/broadcast channel may be determined based on a length of a CI. Alternatively, the length of the CI may be adjusted according to the number of retransmissions required for the multicast/broadcast channel, when the multicast/broadcast channel is established.

Figure 15:
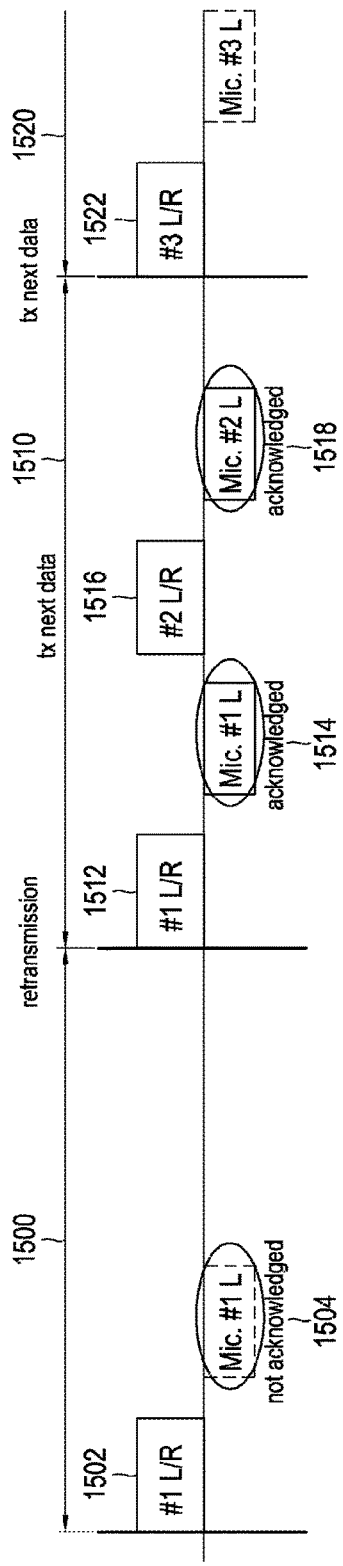
FIG. 15 illustrates an acknowledgement operation of main and sub slave devices according to an embodiment of the present disclosure.

FIG. 15 illustrates an acknowledgement operation of main and sub slave devices according to an embodiment of the present disclosure, showing determination of whether to retransmit data using an acknowledgement from the main slave device in an audio data transmission method using a multicast/broadcast channel.

Referring to FIG. 15, the master device transmits left/right audio data #1 L/R 1502 to multiple slave devices through a multicast/broadcast channel at the start of one CI 1500. The main slave device transmits microphone data Mic. #1 L 1504 in the same CI 1500. If the microphone data Mic. #1 L 1504 transmitted by the main slave device is lost, instead of being forwarded to the master device, or does not include an acknowledgement regarding the audio data #1 L/R 1502, the master device retransmits left/right audio data #1 L/R 1512 at the start of the next CI 1510. For acknowledgement regarding audio data, the main slave device may transmit microphone data even when voice is not sensed. In the CI 1510, the main slave device transmits microphone data Mic. #1 L 1514 including an acknowledgement regarding the left/right audio data #1 L/R 1512. The mater device transmits the next left/right audio data #2 L/R 1516 in the remaining time of the CI 1510, and if the left/right audio data #2 L/R 1516 is acknowledged by microphone data Mic. #2 L 1518 in the CI 1510, then the master device may transmit the next left/right audio data #3 L/R 1522 in the next CI 1520.

Figure 16A:
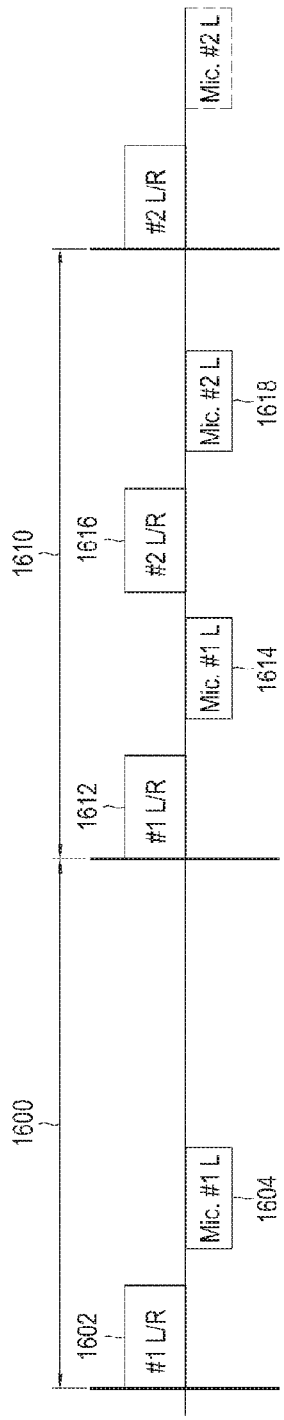
FIGS. 16A and 16B are diagrams for describing management of retransmission by a slave device according to an embodiment of the present disclosure.
Figure 16B:
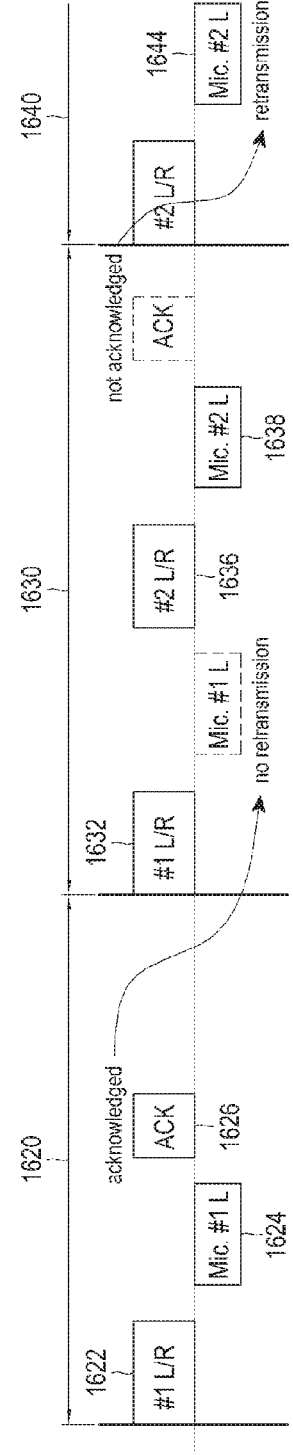

FIGS. 16A and 16B are diagrams for describing management of retransmissions by a slave device according to an embodiment of the present disclosure, showing a case where fixed retransmission by a slave device is used (as illustrated in FIG. 16A) and a case where an acknowledgement by a main slave device is used (as illustrated in FIG. 16B).

Referring to FIG. 16A, the master device transmits audio data #1 L/R 1602 to multiple slave devices through a multicast/broadcast channel at the start of a CI 1600. The main slave device transmits microphone data Mic. #1 L 1604 to the master device in the CI 1600. If the number of retransmissions of microphone data is 2, the main slave device retransmits microphone data Mic. #1 L 1614 after transmission of audio data #1 L/R 1612 in the next CI 1610. In the CI 1610, the next audio data #2 L/R 1616 and the next microphone data Mic. #2 L 1618 may be transmitted. Each audio device may or may not transmit an acknowledgement regarding received data.

Referring to FIG. 16B, the master device transmits audio data #1 L/R 1622 to multiple slave devices through a multicast/broadcast channel at the start of a CI 1620. The main slave device transmits microphone data Mic. #1 L 1624 to the master device in the CI 1620, and the master device transmits an acknowledgement 1626 regarding the microphone data Mic. #1 L 1624 in the CI 1620.

At the start of the next CI 1630, the next audio data #1 L/R 1632 is transmitted, but microphone data Mic. #1 L is not retransmitted because it was acknowledged in the previous CI 1620. In the remaining time of the CI 1630, the next audio data #2 L/R 1636 and the next microphone data Mic. #2 L 1638 are transmitted, but the main slave device fails to receive an acknowledgement regarding the microphone data Mic. #2 L 1638. In the next CI 1640, the main slave device retransmits microphone data Mic. #2 L 1644.

Figure 17:
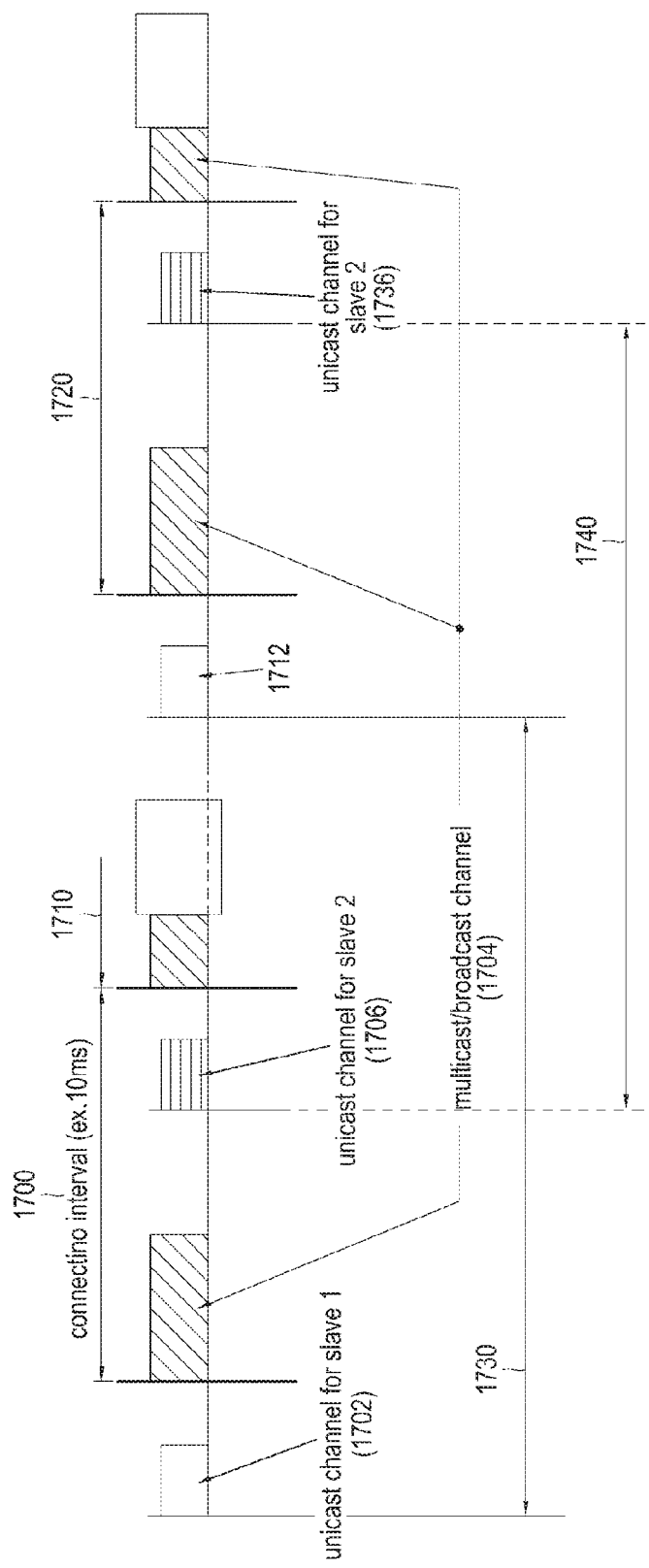
FIG. 17 illustrates channels for multicast/broadcast and unicast transmission according to an embodiment of the present disclosure.

FIG. 17 illustrates channels for multicast/broadcast and unicast transmission according to an embodiment of the present disclosure, in which for mono audio streaming, a CI for a multicast/broadcast channel is 10 ms and a CI for a unicast channel by a slave device is 100 ms.

Referring to FIG. 17, data 1704 of a multicast/broadcast channel is transmitted at the start of each of CIs 1700, 1710, and 1720, each having a length of 10 ms. Data 1702 and 1712 of a unicast channel for a first slave device may be transmitted in every CI 1730 having a length of 100 ms, and data 1706 and 1736 of a unicast channel for a second slave device may be transmitted in every CI 1740 having a length of 100 ms. The CIs 1730 and 1740 for different slave devices are arranged in such a way that their start points do not overlap each other.

Figure 18A:
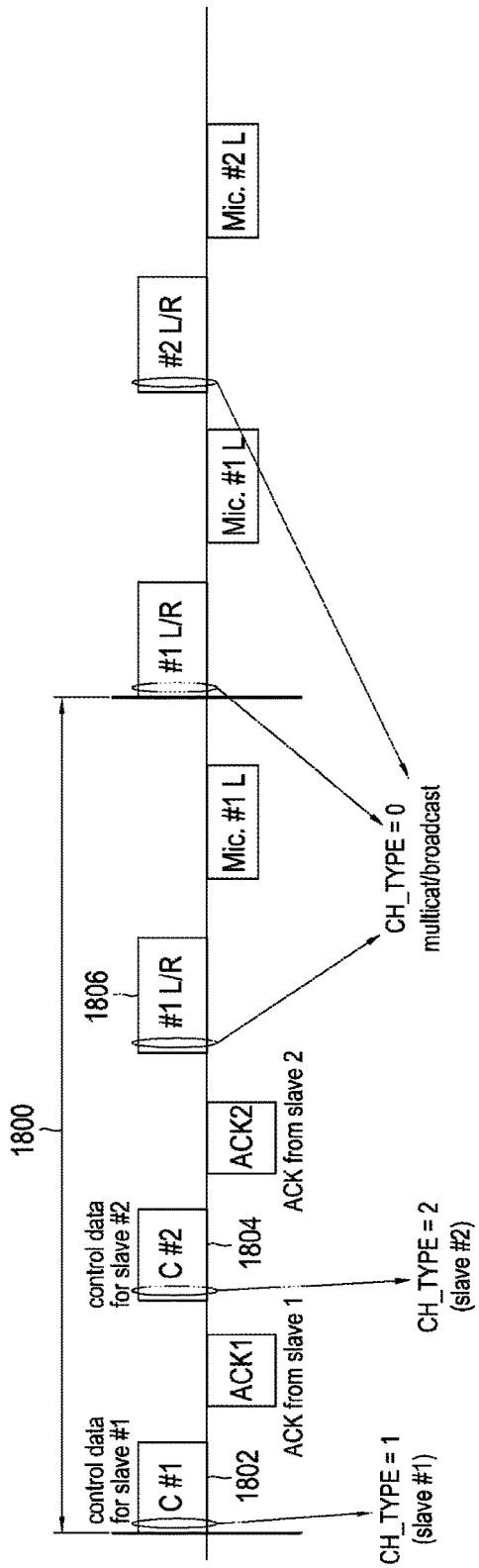
FIGS. 18A and 18B illustrate data transmitted through a same channel and a header structure of the data according to an embodiment of the present disclosure.
Figure 18B:
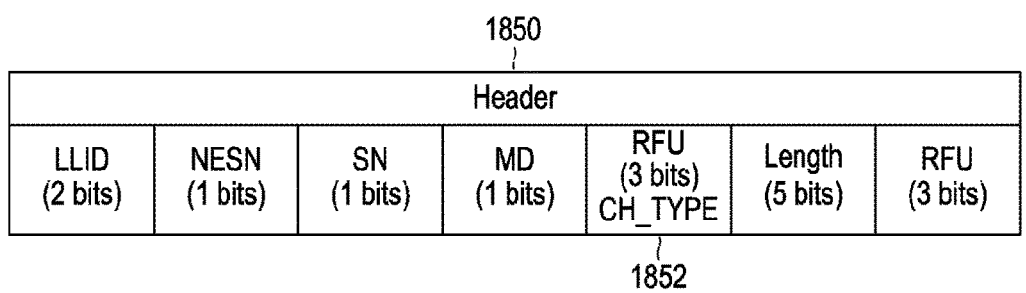

FIGS. 18A and 18B illustrate audio data and control data transmitted through a same multicast/broadcast channel and a header structure thereof according to an embodiment of the present disclosure.

Referring to FIG. 18A, in a CI 1800, the master device transmits control data 1802 and 1804 for first and second slave devices, respectively, and audio data 1806 of a multicast/broadcast channel. The control data 1802 for the first slave device includes a unique value for identifying the first slave device, e.g., a channel type indicator of '1'. The control data 1804 for the second slave device includes a unique value for identifying the second slave device, e.g., a channel type indicator of '2'. Similarly, the audio data 1806 includes a unique value for the multicast/broadcast channel, e.g., a channel type indicator of '0'.

Referring to FIG. 18B, a header 1850 of data transmitted from each audio device includes a channel type indicator CH_TYPE 1852. For example, the channel type indicator 1852 may be one or more bits of an RFU. Each slave device identifies the channel type indicator 1852 from a header of the received data, and if the channel type indicator 1852 has its unique value or has a value assigned to the multicast/broadcast channel, the slave device analyzes the received data. Otherwise, the received data is ignored or discarded.

FIGS. 19A and 19B illustrate a multicast/broadcast channel for stereo audio streaming according to an embodiment of the present disclosure.

Referring to FIG. 19A, instead of transmitting left audio data #1 L 1902 to the left slave device and receiving an acknowledgement ACK 1904, and then transmitting right audio data #1 R 1906 and receiving an acknowledgement ACK 1908 in one CI, the master device transmits audio data #1 L and #1 R 1912 and 1914 including different data in one CI at predetermined intervals. The master device may repetitively retransmit audio data #1 L and #1 R 1912, 1914, 1922, and 1924 a given number of times in one or more CIs, and the slave devices may operate in a power saving mode in the remaining time, instead of listening to a channel for retransmission of the other data, after having successfully received the data once. Each audio data may be repetitively transmitted in one CI or across different CIs, according to a length of a CI and a number of retransmissions.

Referring to FIG. 19B, in a CI, instead of transmitting left audio data #1 L 1932 and left audio data #2 L 1936 to the left slave device, receiving acknowledgements ACK 1934 and 1938 regarding the left audio data #1 L 1932 and #2 L 1936, and then transmitting right audio data #1 R 1942 and right audio data #2 R 1946 and receiving acknowledgements ACK 1944 and 1948 regarding the right audio data #1 R 1944 and #2 R 1948, the master device transmits a pair of audio data #1 L 1952 and #1 R 1954 and a pair of audio data #2 L 1956 and #2 R 1958 at predetermined intervals. The master device repetitively transmits each pair of audio data #1 L 1952 and #1 R 1954 or #2 L 1956 and #2 R 1958 a given number of times in one or more CIs, and after successfully receiving the data once, the slave devices do not need to listen to a channel for reception of the retransmitted data, and may enter a power saving mode in the remaining time of the CIs. Each audio data may be repetitively transmitted in one CI or in different CIs according to a length of a CI and the number of retransmissions.

Figure 20:
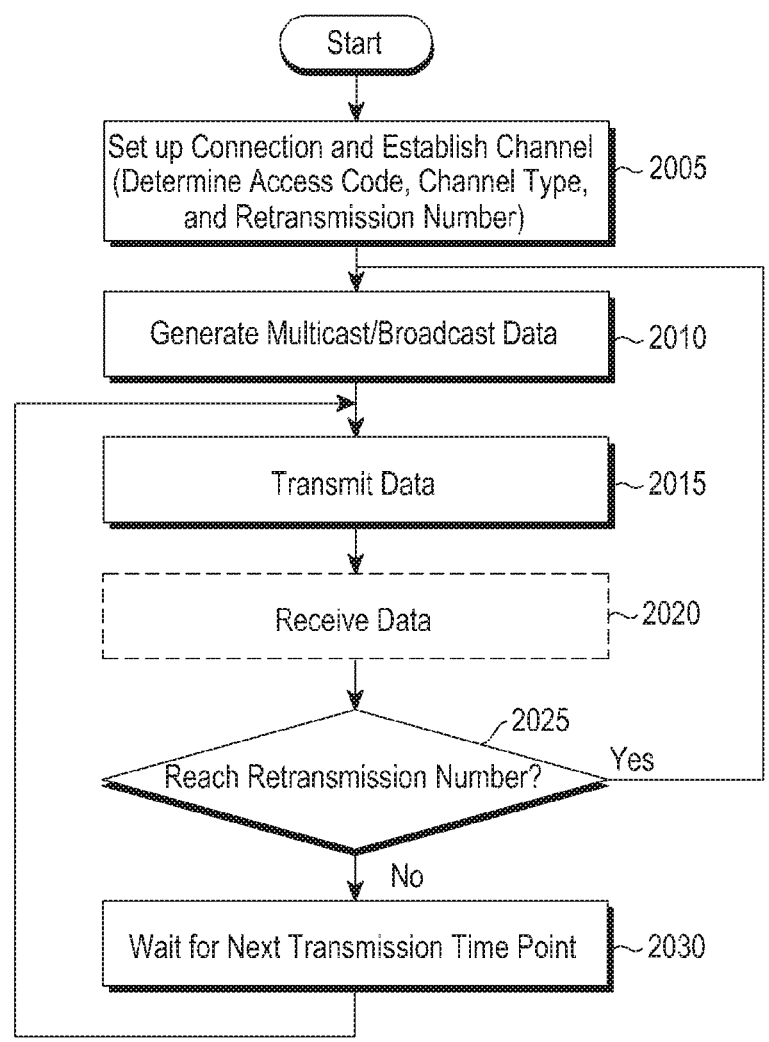
FIG. 20 is a flowchart illustrating operations of a master device according to an embodiment of the present disclosure.

FIG. 20 is a flowchart illustrating operations of a master device according to an embodiment of the present disclosure.

Referring to FIG. 20, in step 2005, the master device sets up a connection with one or more slave devices and establishes a channel During establishment of the channel, an access code to be used as an access address and a type of a channel, i.e., a multicast/broadcast channel or a unicast channel, are determined, and if the channel type is determined to be the multicast/broadcast channel, the number of retransmission times is set. The number of retransmission times may be determined considering a type of audio data (mono or stereo) and a given CI, or may be determined to be a predetermined fixed value.

In step 2010, the master device generates data including audio data to be transmitted. The data includes the access code for the multicast/broadcast channel in an access address field and a channel type indicator indicating the multicast/broadcast channel in a header. The data is referred to as multicast/broadcast data.

In step 2015, the multicast/broadcast data is transmitted to multiple slave devices that set up a connection with the master device.

In step 2020, if data to be received exists, the master device receives microphone data from the main slave device.

In step 2025, the master device determines whether the number of transmissions of the data reaches the set number of retransmissions. If the number of transmissions of the data reaches the set number of retransmissions, operation returns to step 2010 to generate new data. However, when the number of transmissions of the data has not reached the set number of retransmissions, the master device waits for the next transmission time for the same data in step 2030, and then the operation returns to step 2015 to retransmit the same data. The next transmission time may be included in, for example, the same CI or the next CI.

Figure 21:
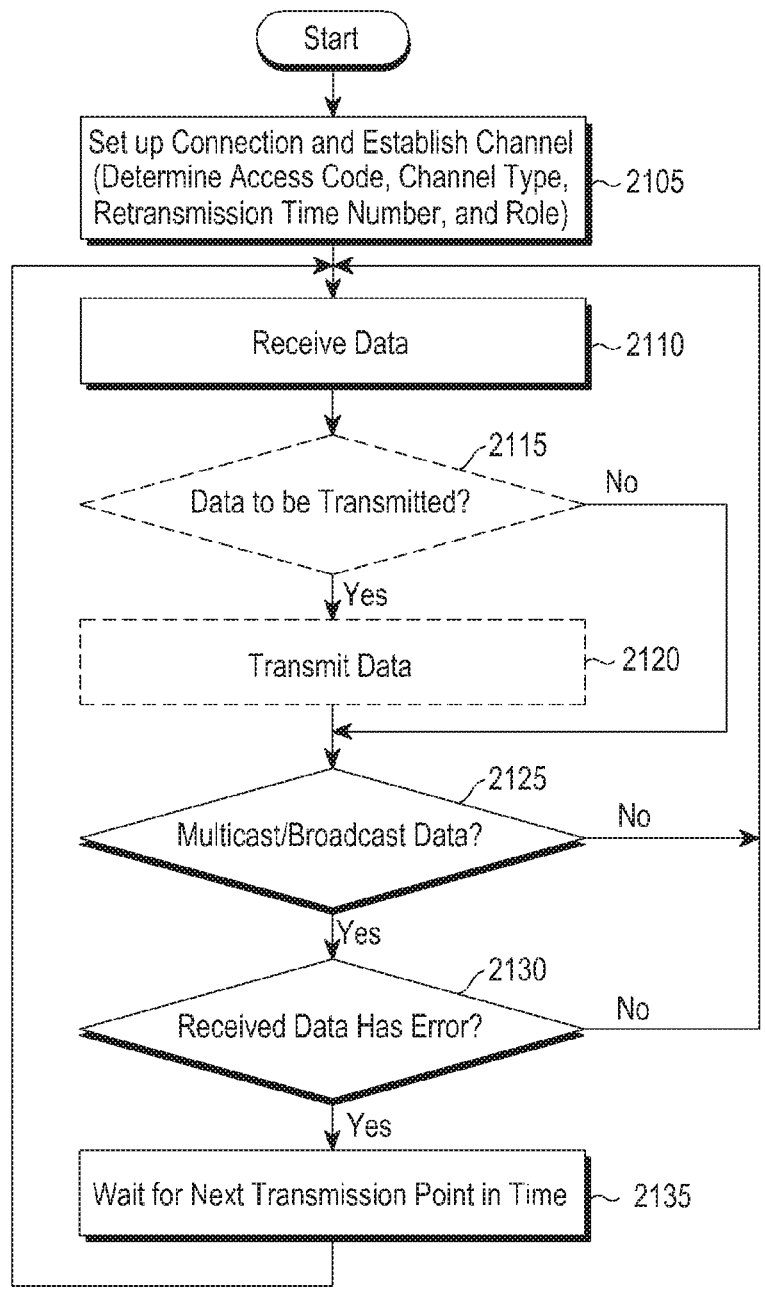
FIG. 21 is a flowchart illustrating operations of a slave device according to an embodiment of the present disclosure.

FIG. 21 is a flowchart illustrating operations of a slave device according to an embodiment of the present disclosure.

Referring to FIG. 21, in step 2105, the slave device sets up a connection with the master device and establishes a channel. As the channel is established, an access code to be used as an access address and a channel type, i.e., a multicast/broadcast channel or a unicast channel is determined, and if a channel type is determined to be the multicast/broadcast channel, the number of retransmissions is set. The number of retransmissions may be indicated by the master device, or may be set to a predetermined fixed value. The slave device may determine whether to operate as a main slave device or a sub slave device when establishing the channel.

In step 2110, the slave device receives data from the master device. If the slave device operates as the main slave device, the slave device determines whether data to be transmitted exists, i.e., whether sensed voice exists, in step 2115, and if the data to be transmitted exists, the slave device transmits microphone data to the master device in step 2120.

In step 2125, the slave device identifies whether the received data is multicast/broadcast data. The multicast/broadcast data includes an access code for the multicast/broadcast channel in an access address field and includes a channel type indicator indicating the multicast/broadcast channel in a header. If the received data is not the multicast/broadcast data, the operation returns to step 2110 to receive new data. However, if the received data is the multicast/broadcast data, the slave device determines whether data transmitted from the master device has an error in step 2130. If there is no error in the data transmitted from the master device in step 2130, the slave device stands by in a power saving mode until a new data transmission point in time, and the operation returns to step 2110 to receive new data.

However, if there is an error in the data transmitted from the master device, the slave device waits for the next transmission point in time for the same data in step 2135, and then the operation returns to step 2110 to receive the same data again. For example, the next transmission time may be included in the same CI or the next CI.

At this time, it can be understood that each illustration of flowcharts and the combination of the flowcharts can be executed by the instructions of a computer program. Since the instructions of the computer program can be loaded in the processor of any of a general purpose computer, a special purpose computer and other programmable data processing equipment, the instructions executed through one of the computer and the processor of the other programmable data processing equipment generates a means for processing the functions explained in the flowchart(s). Since it is possible that these instructions of the computer program are also stored in a memory which can be used and be read in any computer and other programmable data processing equipment which is compatible with the computer so as to implement the function in a specific manner, it is also possible for the instructions stored in the memory which can be used and be read in computer to manufacture a production which includes an instructing means executing the functions explained in blocks of the flowcharts. Since it is possible that the instructions of the computer program can also be loaded in a computer and other programmable data processing equipment, it is also possible to provide the steps of executing the function explained in block(s) of the flowchart processes by instructions which generate a process executed in the computer by executing a series of operation steps on the computer and other programmable data processing equipment.

In addition, each block may represent a module including one or more executable instructions for executing one of a specified logical function, a segment and a part of code.

Further, it should be noted that, in some alternative embodiments, the functions mentioned in the blocks can be generated in different orders. For example, it is also possible that the two blocks which are consecutively shown can be executed substantially at the same time, and that, sometimes, the blocks are executed in reverse order in accordance with a corresponding function.

Various embodiments of the present disclosure may also be embodied as computer-readable code on a computer readable recording medium. A computer-readable recording medium is any data storage device that can store data which can be thereafter read by a computer system. Examples of the computer-readable recording medium include Read-Only Memory (ROM), Random-Access Memory (RAM), Compact Disc (CD)-ROMs, magnetic tapes, floppy disks, optical data storage devices, and carrier waves (such as data transmission through the Internet). The computer-readable recording medium can also be distributed over network coupled computer systems so that the computer-readable code is stored and executed in a distributed fashion. Also, functional programs, code, and code segments for accomplishing the present disclosure can be easily construed by programmers skilled in the art to which the present disclosure pertains.

It will be appreciated that the apparatus and method according to the above described embodiments of the present disclosure may be implemented in a form of hardware, software or a combination of the hardware and software. Such arbitrary software may be stored in a volatile or non-volatile storage device, for example a ROM, a memory, for example, a RAM, a memory chip, a memory device, or a memory integrated circuit, or a storage medium that is optically or magnetically recordable and readable by a machine (for example, a computer), for example, a CD, a Digital Versatile Disk (DVD), a magnetic disc, or a magnetic tape, irrespective of whether the software is erasable or rewritable or not. The method according to various embodiments of the present disclosure may be implemented by a computer or a portable terminal that includes a controller and a memory, in which the memory is an example of a machine-readable storage medium which is suitable for storing a program or programs that contain instructions for implementing the exemplary embodiments of the present disclosure.

Accordingly, the present disclosure includes a storage medium, a program that contains codes for implementing the apparatuses or methods defined in the accompanying claims, and a machine-readable (for example, computer-readable) storage medium that stores the program. In addition, the programs may be electronically transmitted through an arbitrary medium, for example, communication signals transmitted through a wired or wireless connection, and the present disclosure properly includes those equivalent thereto.

Further, the apparatus according to various embodiments of the present disclosure may receive and store the program from wired or wirelessly connected program providing apparatus. The program providing apparatus may include a memory for storing a program that contains instructions for executing the method, a communication unit, such as a transceiver, for performing a wired or wireless communication of the apparatus, and a controller for transmitting the corresponding program to the communication unit in response to a request of the apparatus or automatically.

While the present disclosure has included reference to certain embodiments thereof, it will be understood by those of ordinary skill in the art that various changes in form and details may be made therein without departing from the spirit and scope of the present disclosure, as defined by the following claims and their equivalents.

What is claimed is:

1. A method for transmitting audio data by a master device, the method comprising:
sending from the master device to a plurality of slave devices a control protocol data unit (PDU) having a header including a channel type information by using Bluetooth Low Energy (BLE);
receiving from each of the plurality of slave devices a response corresponding to the control PDU;
establishing a multicast/broadcast channel with each of the plurality of slave devices based on the channel type information;

sending a data packet including audio data to the plurality of slave devices by using the multicast/broadcast channel of the BLE; and repetitively transmitting the data packet to the plurality of slave devices through the multicast/broadcast channel a number of times.

2. The method of claim 1, further comprising:

receiving an acknowledgement regarding the data packet from only a main slave device among the plurality of slave devices.

3. The method of claim 2, wherein the main slave device is selected among the plurality of slave devices when the main slave device has a microphone or when the main slave device is first connected to the master device among the plurality of slave devices.

4. The method of claim 1, further comprising:

receiving audio data regarding a microphone along with an acknowledgement from a slave device among the plurality of slave devices.

5. The method of claim 1, wherein the number of times is determined by a channel scanning to determine a channel quality.

6. The method of claim 1, further comprising:

updating the number of times through a channel update procedure in a connection state.

7. The method of claim 1, wherein the master device is configured to set a separate channel from the multicast/broadcast channel to send the control PDU.

8. The method of claim 1, wherein the data packet further comprises a header including at least one of an access address for the multicast/broadcast channel and/or a channel type indicator indicating the multicast/broadcast channel.

9. A method for receiving audio data by a slave device, the method comprising:

receiving from a master device a control protocol data unit (PDU) having a header including a channel type information by using Bluetooth Low Energy (BLE);

sending a response to the control PDU;

determining whether to operate as a main slave or a sub slave;

establishing a multicast/broadcast channel with the master device; and receiving a data packet including audio data through the multicast/broadcast channel of the BLE.

10. The method of claim 9, wherein the slave device determines whether to operate as the main slave or the sub slave based on a connection sequence.

11. The method of claim 9, further comprising repetitively receiving the data packet from the master device through the multicast/broadcast channel a number of times.

12. The method of claim 11, further comprising transmitting an acknowledgement regarding the data packet to the master device to stop repetitive transmitting of the data packet by the master device, after successfully receiving the data packet, wherein the acknowledgement is transmitted with microphone data.

13. The method of claim 11, wherein the number of times is determined based on at least one of a type of the audio data, the number of the plurality of slave devices, and/or a length of a Connection Interval (CI) during setting of a channel connection or a channel update during the connection.

14. The method of claim 11, wherein the number of times is determined by a channel scanning to determine a channel quality.

15. The method of claim 9, wherein the data packet further comprises a header including at least one of an access address for the multicast/broadcast channel and/or a channel type indicator indicating the multicast/broadcast channel.

16. The method of claim 9, further comprising changing a role of the slave device between the main slave and the sub slave by a role change procedure.

17. An apparatus for transmitting audio data, the apparatus comprising:

a communication circuit; and a processor configured to set up a connection with a plurality of slave devices by sending a control protocol data unit (PDU) having a header including a channel type information by using Bluetooth Low Energy (BLE), to generate a data packet comprising the audio data, and to control the communication circuit to repetitively transmit the data packet to the plurality of slave devices through a multicast/broadcast channel a number of times.

18. The apparatus of claim 17, wherein the processor is further configured to receive an acknowledgement regarding the data packet from only a main slave device among the plurality of slave devices.

19. The apparatus of claim 18, wherein the main slave device is selected among the plurality of slave devices when the main slave device has a microphone or when the main slave device is first connected to a master device among the plurality of slave devices.

20. The apparatus of claim 19, wherein the processor is further configured to distinguish control data from audio data in a PDU based on a header of the PDU or a channel Identification number of a header of Logic Link Control and Adaptation (L2CAP) included in a header or payload of the PDU.

\* \* \* \* \*